(12) United States Patent
Kuwahara et al.

(10) Patent No.: US 8,108,581 B2
(45) Date of Patent: Jan. 31, 2012

(54) INFORMATION PROCESSING APPARATUS

(75) Inventors: Kazuyoshi Kuwahara, Akiruno (JP); Isamu Uchiyama, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/816,944

(22) Filed: Jun. 16, 2010

(65) Prior Publication Data

US 2010/0332708 A1 Dec. 30, 2010

(30) Foreign Application Priority Data

Jun. 30, 2009 (JP) ................. 2009-156265

(51) Int. Cl.
*G06F 13/26* (2006.01)
(52) U.S. Cl. .................. 710/107; 710/305; 713/320
(58) Field of Classification Search .............. 710/107, 710/100, 305–306; 713/320–344
See application file for complete search history.

(56) References Cited

U.S. PATENT DOCUMENTS

| | | | |
|---|---|---|---|
| 5,944,828 A | 8/1999 | Matsuoka | |
| 7,290,152 B2 | 10/2007 | Dubinsky | |
| 7,441,127 B2 * | 10/2008 | Sugasawa | 713/300 |
| 7,596,686 B2 | 9/2009 | Dubinsky | |
| 2004/0128564 A1 | 7/2004 | Dubinsky | |
| 2005/0240784 A1 | 10/2005 | Sugasawa | |
| 2006/0026315 A1 | 2/2006 | Hong et al. | |
| 2007/0237216 A1 | 10/2007 | Ku et al. | |
| 2007/0266266 A1 | 11/2007 | Dubinsky | |

FOREIGN PATENT DOCUMENTS

| | | |
|---|---|---|
| JP | 10-097353 | 4/1998 |
| JP | 2004-038546 | 2/2004 |
| JP | 2004-206530 | 7/2004 |
| JP | 2005-316593 | 11/2005 |
| JP | 2006-040293 | 2/2006 |
| JP | 2006-512650 | 4/2006 |
| JP | 2007-282246 | 10/2007 |

OTHER PUBLICATIONS

Japanese Patent Application No. 2009-156265; Notification of Reasons for Rejection; mailed Oct. 26, 2010 (English Translation).

* cited by examiner

*Primary Examiner* — Khanh Dang
*Assistant Examiner* — Kim Huynh
(74) *Attorney, Agent, or Firm* — Blakely, Sokoloff, Taylor & Zafman LLP

(57) ABSTRACT

According to one embodiment, an information processing apparatus including a suspension/resume function includes a bus controller which controls a bus capable of transmitting data at a first transmission speed or a second transmission speed lower than the first transmission speed, a storage module which stores setting information for limiting a data transmission speed of the bus to the second transmission speed, an initializing module which initializes the bus controller so as to limit the data transmission speed of the bus to the second transmission speed if the setting information is stored in the storage module when the apparatus is activated or returned from a suspended state, and a controller which stores the setting information into the storage module and makes the apparatus transit to the suspended state and return from the suspended state, when the transmission speed of the bus is limited to the second transmission speed.

5 Claims, 4 Drawing Sheets

INFORMATION PROCESSING APPARATUS

CROSS-REFERENCE TO RELATED APPLICATIONS

This application is based upon and claims the benefit of priority from Japanese Patent Application No. 2009-156265, filed Jun. 30, 2009; the entire contents of which are incorporated herein by reference.

FIELD

Embodiments described herein relate generally to a power-saving control technique suitable for, for example, a notebook-type personal computer which can be driven by a battery.

BACKGROUND

Recently, portable, battery-driven notebook and netbook personal computers have been gaining much popularity. Various features for saving power are incorporated in computers of this type in order to maximize the battery operating time.

For example, Jpn. Pat. Applin. KOKAI Publication No. 2006-40293 discloses optimization of a link speed of a serial advanced technology attachment (hereinafter abbreviated as SATA) interface. More specifically, a mechanism for restraining wasteful power consumption by controlling use of a needlessly high link speed which is incompatible with system specifications.

In general, in a computer which performs data transfer to/from hard disk drives (HDDs) and optical disk drives (ODDs) by a SATA interface, the operating system thereof is restarted (to give an opportunity for an initial setting for a SATA host controller) to switch the link speeds of the SATA interface.

Therefore, for example, if a request for reducing power consumption is issued upon pulling-out an alternating current (AC) adapter during power-on of such a computer, the request for reducing power consumption cannot instantly be responded to by reducing the link speed of the SATA interface thereof (without restarting the operating system). In other words, reduction of a link speed of a SATA interface cannot be achieved when a normal mode is dynamically switched to a power saving mode.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an information processing apparatus including a suspension/resume function includes a bus controller which controls a bus capable of transmitting data at a first transmission speed or a second transmission speed lower than the first transmission speed, a storage module which stores setting information for limiting a data transmission speed of the bus to the second transmission speed, an initializing module which initializes the bus controller so as to limit the data transmission speed of the bus to the second transmission speed if the setting information is stored in the storage module when the apparatus is activated or returned from a suspended state, and a controller which stores the setting information into the storage module and makes the apparatus transit to the suspended state and return from the suspended state, when the transmission speed of the bus is limited to the second transmission speed.

Figure 1:
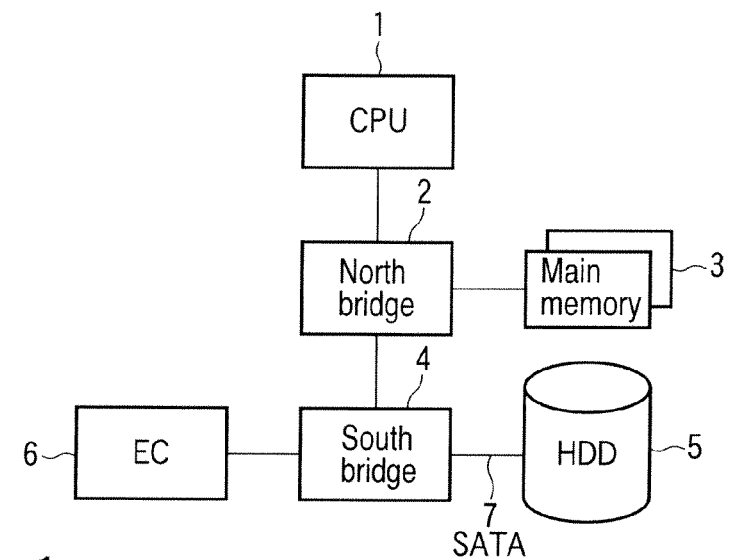
FIG. 1 is an exemplary view showing a partial configuration of an information processing apparatus according to an embodiment.

FIG. 1 is an exemplary view showing a partial configuration of an information processing apparatus according to an embodiment. This information processing apparatus is constructed as a notebook or netbook personal computer.

As shown in FIG. 1, the computer includes a central processing unit (CPU) 1, a north bridge 2, a main memory 3, a south bridge 4, a HDD 5, and an embedded controller (EC) 6. Further, the HDD 5 is connected to the south bridge 4 through a SATA interface 7.

The CPU 1 is a processor which controls the operation of the present computer, and executes various programs which is loaded to the main memory 3 from the HDD 5, such as an operating system, utilities, and applications. The programs include a power-saving control program, described later. The CPU 1 also executes a basic input/output system (BIOS) stored in an unillustrated BIOS-ROM. The BIOS is a hardware control program. The north bridge 2 is a bridge device which connects the CPU 1 and the south bridge 4. The north bridge 2 includes a memory controller for controlling access to the main memory 3.

The main memory 3 is a main storage of the present computer, which stores various programs executed by the CPU 1 and various data which is input/output under control of the various programs. The south bridge 4 is a device controller which controls various devices including the HDD 5 in the present computer.

The HDD 5 is an external storage medium of the present computer. The HDD 5 stores a large volume of various programs and data as a subsidiary storage device. The EC 6 is a one-chip micro processing unit (MPU) for managing operating states of the present computer. The EC 6 includes a keyboard controller which controls a keyboard and a pointing device.

The SATA interface 7, which connects the south bridge 4 and HDD 5, is a common interface for incorporating subsidiary storage devices into the system, and it supports two link speeds; 1.5 Gbps and 3 Gbps. A further link speed of 6 Gbps is planned to be supported soon.

The HDD 5 will be described as an example of a subsidiary storage device connected to the south bridge 4 through the SATA interface 7. The subsidiary storage device is not limited to the HDD 5, and may be, for example, a solid state drive (SSD) provided the SATA interface 7 is used.

Figure 2:
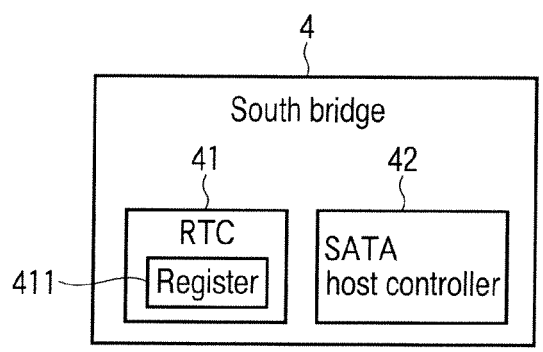
FIG. 2 is an exemplary view showing a schematic block of a south bridge comprised in the information processing apparatus according to the embodiment.

FIG. 2 is an exemplary view showing a schematic block of the south bridge 4.

Figure 3:
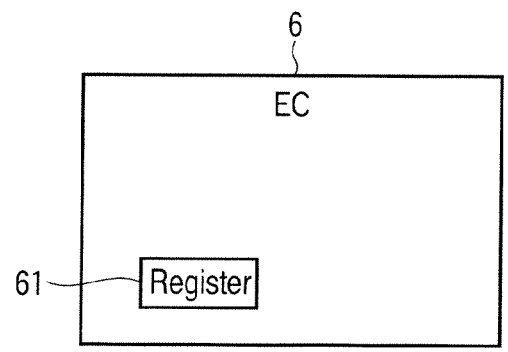
FIG. 3 is an exemplary view showing a schematic block of an embedded controller (EC) comprised in the information processing apparatus according to the embodiment when a register is implemented in the EC.

As shown in FIG. 2, the south bridge 4 includes a real time clock (RTC) 41 and a SATA host controller 42. The RTC 41 is a clock module provided with its own backup power supply, and includes a register 411 which maintains information by using the backup power supply even when the present computer is powered off. Various setting information, described later, is stored in the register 411. Alternatively, a register to store various setting information may be provided in the EC 6 because the EC 6 which performs power management is continuously supplied with electric power while the present computer is powered off. FIG. 3 is an exemplary view showing a schematic block of the EC 6 when such a register (register 61) to store various setting information is implemented.

The SATA host controller 42 manages overall control concerning data transfer to/from subsidiary storage devices connected by the SATA interface 7, and includes a function to appropriately determine link speeds, based on link speeds supported by the subsidiary storage devices. The function of the SATA host controller 42 achieves optimization of data transfer speeds as follows. That is, data transfer is performed at 1.5 Gbps if a subsidiary storage device which supports only a link speed of, for example, 1.5 Gbps is connected. Alternatively, data transfer is performed at 3 Gbps if a subsidiary storage device which supports two link speeds of 1.5 Gbps and 3 Gbps is connected.

To choose the low speed of 1.5 Gbps is naturally possible when a subsidiary storage device supports both link speeds of 1.5 Gbps and 3 Gbps. The SATA host controller 42 has the right to determine the link speed. The SATA host controller 42 performs training (i.e., recognizes link speeds which a connected subsidiary storage device supports) as an initial processing, to thereby determine a link speed and then establish a link to the subsidiary storage device. Between 1.5 Gbps and 3 Gbps, less power is consumed at the lower speed of 1.5 Gbps. From this point of view, the present computer performs power saving control as described below.

The HDD 5 of the present computer is assumed to support both link speeds of 1.5 Gbps and 3 Gbps. Therefore, for example, when the present computer is powered on to start up the operating system, the initial processing is carried out by the SATA host controller 42. Then, the link speed of the SATA host controller 42 connected to the HDD 5 is, basically, set to 3 Gbps.

On the present computer, the power-saving control program operates as a resident program. The present computer achieves reduction of power consumption in a manner as follows. As the power-saving control program cooperates with the BIOS, the link speed of the SATA interface 7 is switched from 3 Gbps to 1.5 Gbps without restarting the operating system (to give an opportunity to set a link speed in the SATA host controller 42) if an event occurs, e.g., if the AC adapter is removed while the power is on. This feature will be described in detail below.

Figure 4:
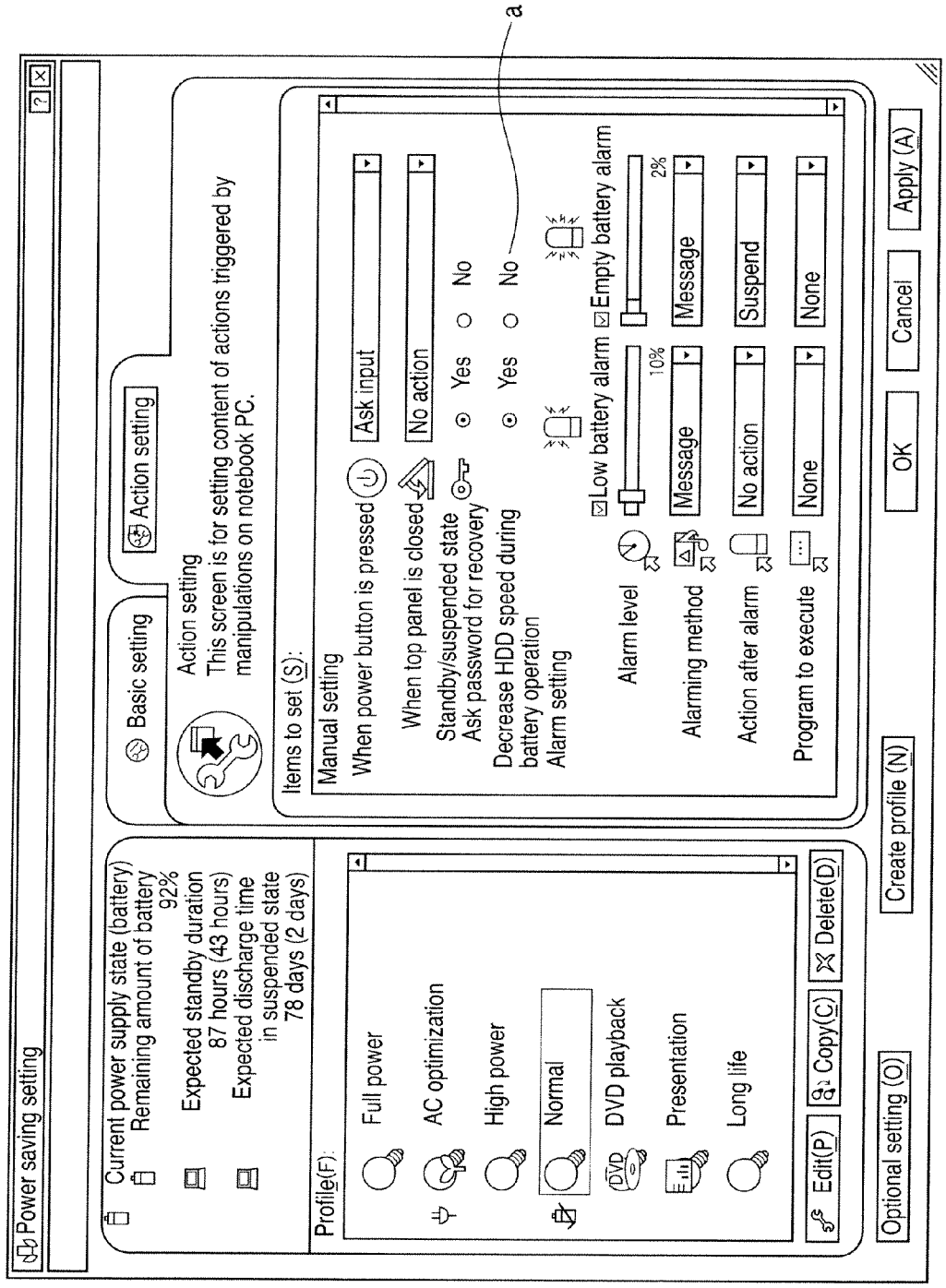
FIG. 4 is an exemplary view showing an example of a setting screen presented by a power-saving control program which runs on the information processing apparatus according to the embodiment.

The power-saving control program includes a user interface function to present a setting screen, such as that illustrated in FIG. 4, to the user, to allow the user to enter various power saving settings. An item to "decrease HDD speed during battery operation" (denoted at "a" in FIG. 4) is provided as an item which users can set on the setting screen. If "yes" is set in this item, the link speed of the SATA interface 7 is switched from 3 Gbps to 1.5 Gbps when the AC adapter is removed while the power is on. The content of settings made on the setting screen is stored as setting information into the register 411 in the RTC 41 included in the south bridge 4 (or into the register 61 in the EC 6). Not only settings on the setting screen but also switching of the link speed from 3 Gbps to 1.5 Gbps may be appropriately specified by the user.

Figure 5:
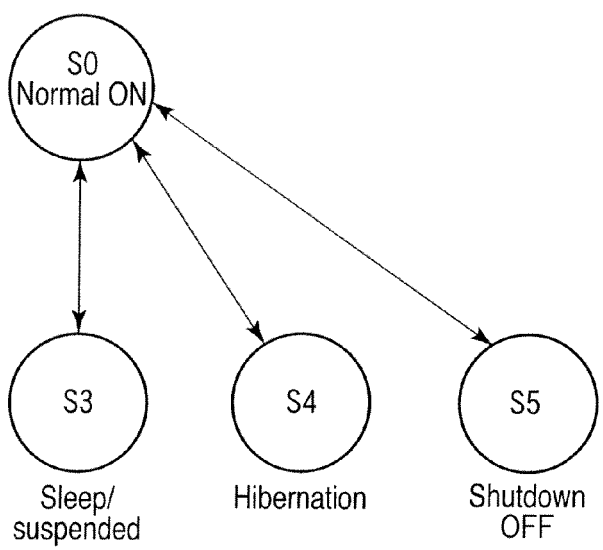
FIG. 5 is an exemplary view showing transitional relationships between power supply states in the information processing apparatus according to the embodiment.

FIG. 5 is an exemplary view showing transitional relationships between power supply states in the present computer.

As shown in FIG. 5, the present computer can be in any of the following power supply states, i.e., a normal ON state (S0), a sleep/suspended state (S3), a hibernation state (S4), and a shutdown OFF state (S5). Of these states, the sleep/suspended state (S3) enables the present computer to transit to a power saving state while maintaining contents of the main memory 3. When the normal ON state (S0) recovers from the sleep/suspended state (S3), the operation of transiting to the sleep/suspended state (S3) can then be continuously restarted. Further, when the normal ON state (S0) recovers from the sleep/suspended state (S3), training is carried out again by the SATA host controller 42 to thereby reconstruct a link. The time required for this transition from the normal ON state (S0) through the sleep/suspended state (S3) to the normal ON state is far shorter than the time required for transition from the normal ON state (S0 with restart of the operating system) through the shutdown OFF state (S5) to the normal ON state (S0). Hence, the present computer executes switching of link speeds of the SATA interface 7 through the route described above.

Figure 6:
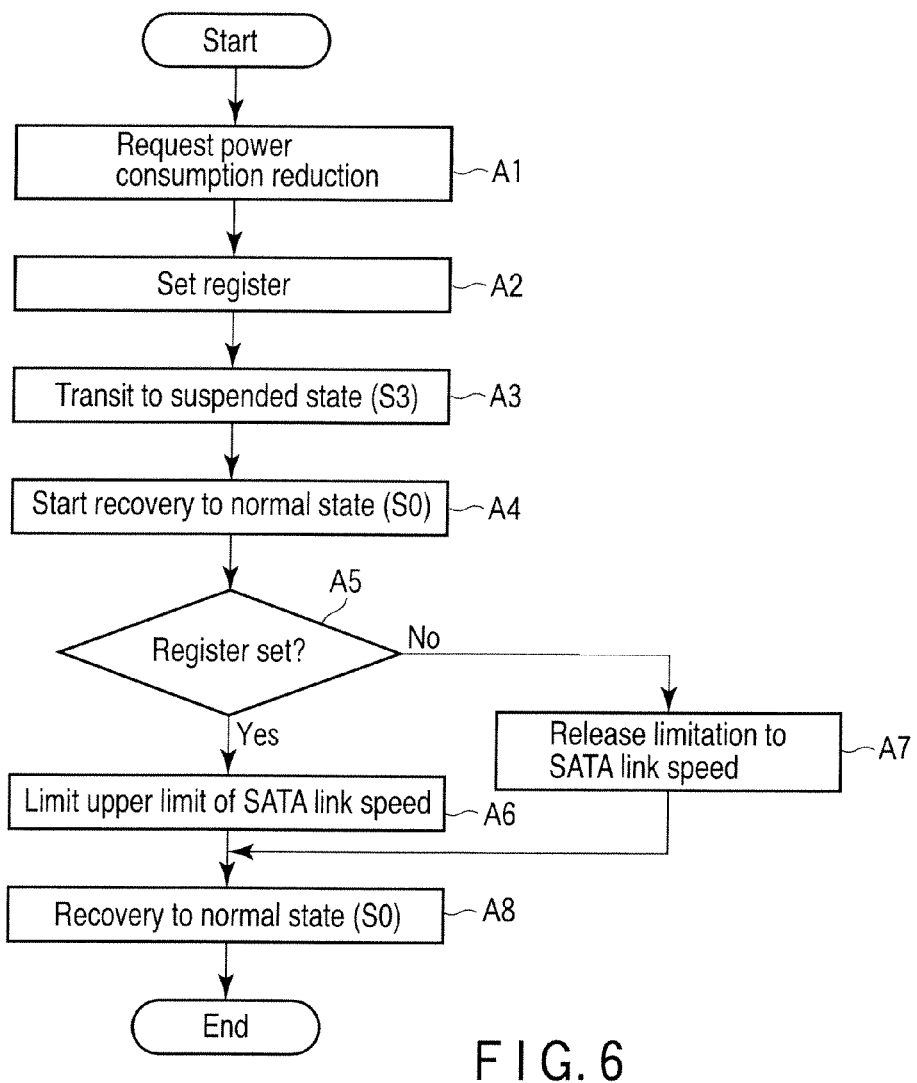
FIG. 6 is an exemplary first flowchart showing an operation procedure of power-saving control based on link speed switching of a SATA interface which is performed by the information processing apparatus according to the embodiment.
Figure 7:
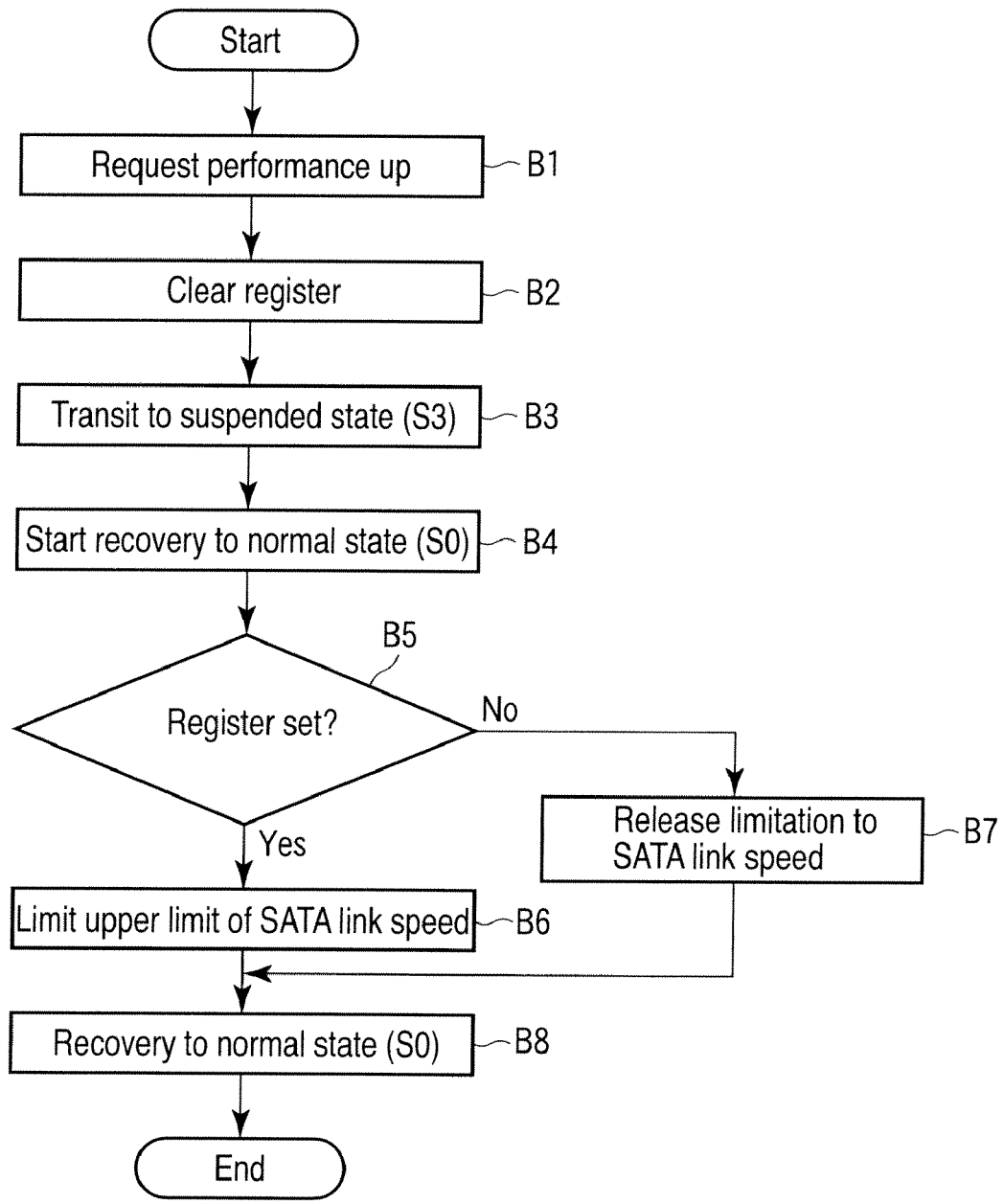
FIG. 7 is an exemplary second flowchart showing an operation procedure of the link speed switching of the SATA interface which is performed by the information processing apparatus according to the embodiment.

FIG. 6 and FIG. 7 are exemplary flowcharts showing operation procedures of the power-saving control in the present computer, relating to the switching of link speeds of the SATA interface 7.

The present computer is now assumed as being connected to an AC adapter and operated by electric power from an external power supply. On the setting screen shown in FIG. 4, an item "decrease HDD speed during battery operation" (denoted at "a" in FIG. 4) is assumed as being set to "yes".

Under these circumstances, for example, the AC adapter is removed and the present computer transits to battery operation. Then, the EC 6 which performs operation state management for the present computer issues a "power consumption reduction request" (block A1 in FIG. 6). Based on issuance of the "power consumption reduction request", the power-saving control program stores setting information indicating the issuance of the "power consumption reduction request" into the register 411 in the RTC 41 included in the south bridge 4 (or into the register 61 in the EC 6: the registers 411 and 61 will each be hereinafter simply referred to as a register) (block A2 in FIG. 6), and lets the present computer transit to the sleep/suspended state (S3) (block A3 in FIG. 6). Recovery from the sleep/suspended state (S3) to the normal ON state (S0) is usually triggered by issuance of an event, such as press-down of a power supply button. In the present computer, the power-saving control program sets the computer so that recovery to the normal ON state is started continuously after completion of transition to the sleep/suspended state (S3). The power-saving control program then lets the present computer transit to the sleep/suspended state (S3).

When the recovery to the normal ON state (S0) from the sleep/suspended state (S3) starts, the BIOS then checks whether the setting information indicating issuance of the "power consumption reduction request" is stored in the register or not (block A5 in FIG. 6). If the setting information is stored (YES in block A5 in FIG. 6), the BIOS instructs the SATA host controller 42 to limit the link speed to, for example, 1.5 Gbps (block A6 in FIG. 6).

If the setting information is not stored (NO in block A6 in FIG. 6), the BIOS instructs the SATA host controller 42 to release the limitation to the link speed (regardless of whether the link speed is limited or not) (block A7 in FIG. 6).

Upon recovery to the normal ON state (S0) (block A8 in FIG. 6), training is carried out by the SATA host controller 42 in accordance with recovery from the sleep/suspended state (S3), to thereby reconstruct a link. In this manner, 1.5 Gbps is adopted as a link speed in place of 3 Gbps.

If the AC adapter is connected during battery operation, the EC 6 issues a "performance up request" (block B1 in FIG. 7). Based on issuance of the "performance up request", the power-saving control program erases the setting information indicating the issuance of the "power consumption reduction request" stored in the register (block B2 in FIG. 7).

Blocks B3 to B8 in FIG. 7 correspond to blocks A3 to A8 in FIG. 6 described previously. If the setting information stored in the register is erased, the SATA host controller 42 is instructed to release the limitation to the link speed by the BIOS (NO in block B5, and block B7 in FIG. 7). Therefore, when the normal ON state (S0) is recovered (block B8 in FIG. 7), training is carried out again by the SATA host controller 42 in accordance with recovery from the sleep/suspended state (S3). A link is thereby reconstructed so that the maximum speed of 3 Gbps is applied again as a link speed.

As described above, the present computer performs switching of link speeds of the SATA host controller 42 by suspension/resume which requires only a short time and maintains an existing operating state without restart, which involves shutdown of the operating system, for each of switching from 1.5 Gbps to 3 Gbps and switching from 3 Gbps to 1.5 Gbps.

An example of switching link speeds of the SATA interface 7 connecting the south bridge 4 and the HDD 5 has been described above. However, the method of the invention to practically perform a switching processing by using suspension/resume is not limited to this example but is available, for example, for switching between operation modes in a device having plural operation modes.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. An information processing apparatus comprising a suspension/resume function, comprising:
   a bus controller configured to control a bus capable of data transfer at a first transmission speed or a second transmission speed lower than the first transmission speed;
   a storage module configured to store setting information for limiting a transmission speed of the bus to the second transmission speed;
   an initializing module configured to initialize the bus controller so as to limit the data transmission speed to the second transmission speed if the setting information is stored in the storage module when the apparatus is activated or returned from a suspended state; and
   a controller configured to limit the data transmission speed to the second transmission speed when a state of operation by externally-input electric power transits to a state of operation by electric power from the battery by storing the setting information into the storage module and making the apparatus transit to the suspended state and return from the suspended state.

2. The apparatus of claim 1, wherein the control module is configured to delete the setting information in the storage module and to make the apparatus transit to the suspended state and return from the suspended state, when the limiting of the data transmission speed of the bus is released.

3. The apparatus of claim 1, wherein the bus conforms with a serial advanced technology attachment (ATA) standard.

4. The apparatus of claim 1, further comprising a setting module configured to set whether or not the data transmission speed of the bus is to be limited to the second transmission speed when a state of operation by externally-input electric power transits to a state of operation by electric power from the battery.

5. The apparatus of claim 1, wherein the storage device is provided in a real time clock (RTC).

* * * * *